April 10, 1934.  W. SPETZ  1,954,759
CHUCK
Filed Dec. 8, 1930  2 Sheets-Sheet 1

Inventor:
Wilhelm Spetz
per
Attorney

April 10, 1934.  W. SPETZ  1,954,759
CHUCK
Filed Dec. 8, 1930   2 Sheets-Sheet 2

Inventor:
Wilhelm Spetz
per
Attorney

Patented Apr. 10, 1934

1,954,759

UNITED STATES PATENT OFFICE 1,954,759

CHUCK

Wilhelm Spetz, Duisburg-Meiderich, Germany

Application December 8, 1930, Serial No. 500,824
In Germany May 23, 1927

6 Claims. (Cl. 90—59)

In milling and planing machines for milling or planing plates, such as hook plates, ribbed plates and the like, which are used for securing rails, it is already known to use chucks the fixed jaws of which are constituted by claw-like projections of the milling table shaped to correspond to the surface, important to the maintenance of the measurements, of the side of the plates to be treated, while the movable jaws of the chuck support the back of the plates and are so disposed that they grip the plate at the back and press the side being treated against said claw-like projections.

The invention consists in equipping the table of a chuck of this type with several groups of claw-like projections, arranged in rows and with fluid pressure actuators acting simultaneously in each of said groups underneath a plate so as to press the surface to be treated of said plate against the claw-like projections without the necessity of adjusting the plates. This has the advantage that when there is a considerable demand for plates a large number of plates can be chucked and worked simultaneously, several planing tools, such as milling cutters for example, being operable side by side, simultaneously, or the chuck may be so designed that the milling cutters operate as the different rows of plates move to and fro so as to combine maximum utility with high efficiency and extremely low cost.

The chuck according to the invention may also advantageously be so designed that, while one or more groups of plates are being treated, other groups of finished plates can be removed from the chuck and replaced by fresh plates so that thus the plates can be treated in uninterrupted succession.

For rotary milling machines which are provided with gripping members on each side and in which the milling cutters cut on the forward and return stroke, the chuck may, according to the invention be so constructed that the claw-like projections for one end of the plates are formed in pairs at the opposite ends of a U-shaped bracket which is detachably connected to one side of the chuck itself, while a similar bracket is detachably secured to the opposite side of the chuck for the other end of the plates. This arrangement provides very satisfactory and simple construction of the chuck and also ready accessibility to the supporting devices combined with easy interchangeability of the parts.

Two embodiments of the chuck according to the invention are illustrated in the accompanying drawings.

In Figures 1 to 4 of the drawings, $a$ denotes the table-shaped chuck, the continuous longtiudinal ribs $b$ of which are provided with discontinuous claw-shaped projections or hook-jaws $c$. $e$ are cylindrical holes in the chuck $a$, into which fit pistons (not shown) operated by compressed air and by means of which the plates which are to be treated are pressed from below against the projections $c$. The height $f$ is such that the plates can be introduced obliquely in the intervals between the projections $c$ at three intermediate points of the chuck in each of the four rows. The two corresponding compressed air pistons in each row are put in communication with each other, so as to form a separate group, by means of passages $g$. $d$ are the four inlet openings for the compressed air in each of said four groups.

Figure 1:
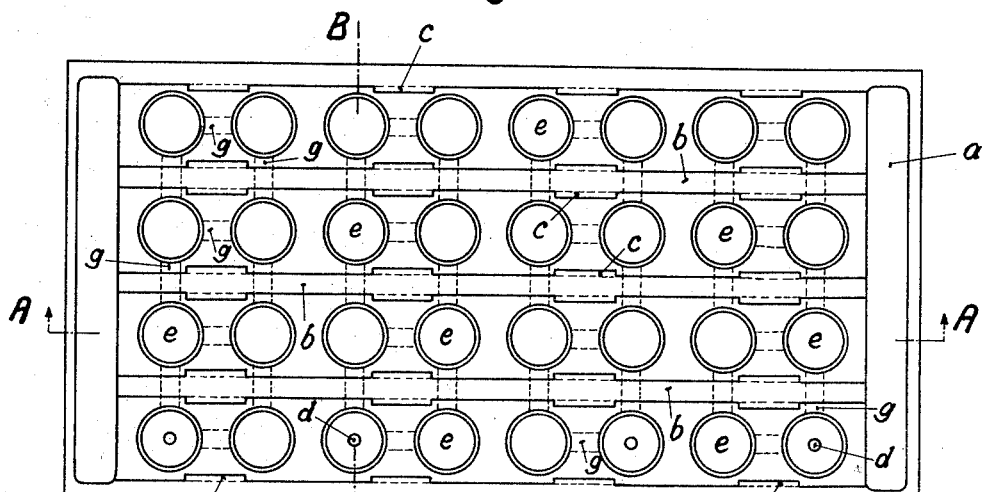
Figure 1 shows in plan a table-shaped chuck for simultaneous milling of ribbed plates disposed in four adjacent rows.
Figure 2:
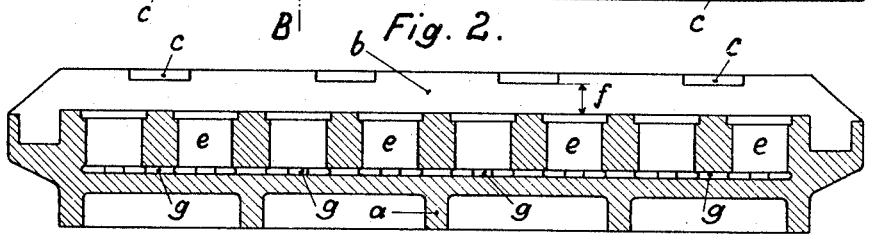
Figure 2 is a longitudinal section taken on the line A—A of Figure 1.
Figure 3:
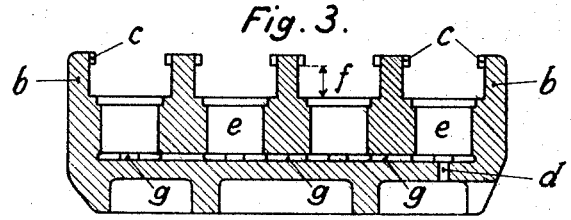
Figure 3 is a transverse section taken on the line B—B of Figure 1.
Figure 4:
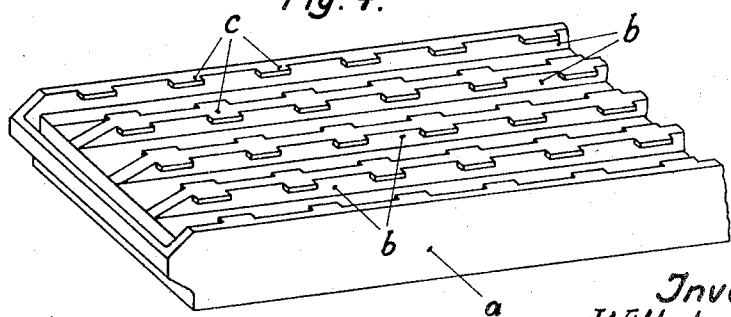
Figure 4 shows in perspective the embodiment shown in Figures 1–3.
Figure 5:
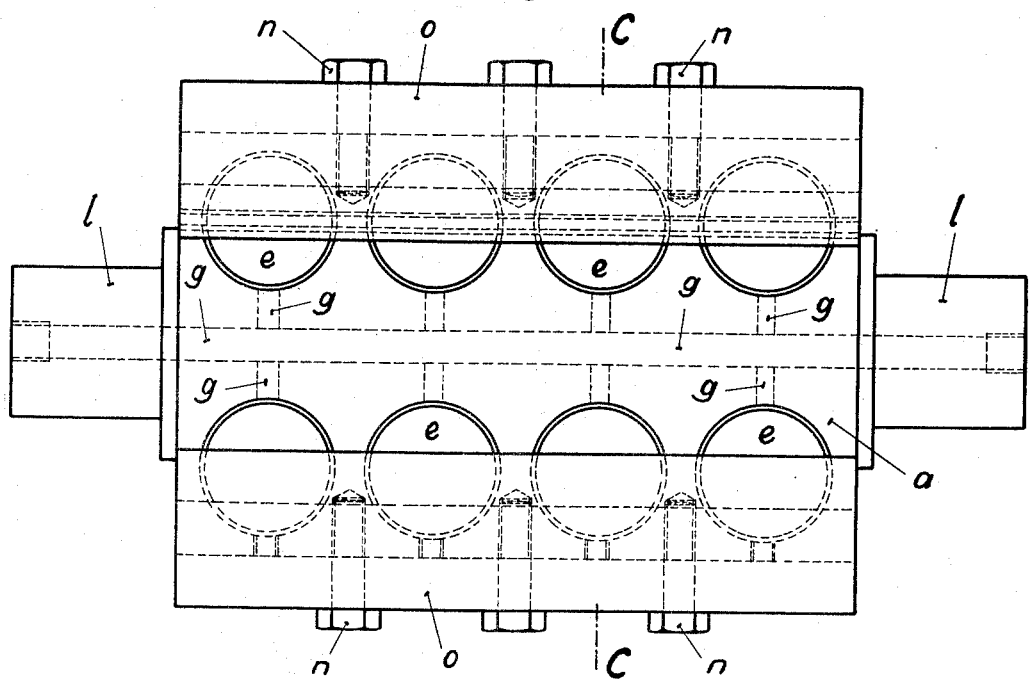
Figure 5 illustrates a double sided rotatable chuck for use in connection with hook plates.
Figure 6:
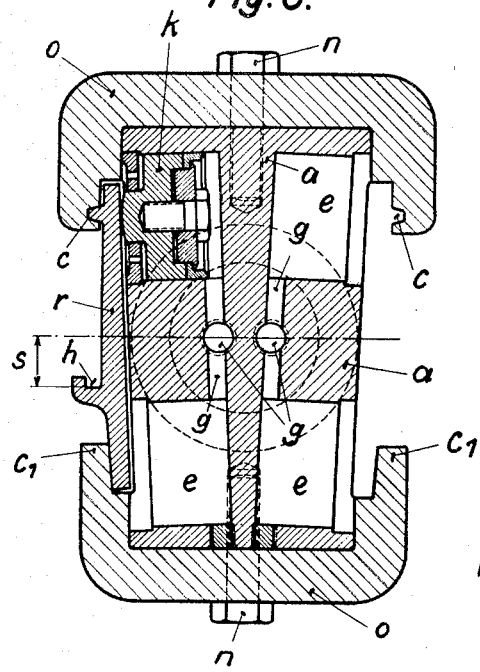
Figure 6 is a transverse section taken on the line C—C of Figure 5.

In Figures 5 and 6, $a$ denotes the rotary chuck which can be rotated about the shaft $l$; it is provided on each side with 8 holes $e$ into which work pistons $k$ operated by compressed air. The compressed air for operating the pistons $k$ is supplied through the passages $g$ simultaneously to the 8 pistons on each side of the chuck, i. e. separately on each side. On both lateral edges of the chuck, screws $n$ hold two U-shaped brackets $o$, both ends of each of which are provided with claw-like projecting hook-jaws $c^1$. The projections $c^1$ of one of said brackets $o$ are provided with grooves $c$ into which fit the rib of the plate which has to be milled. $r$ denotes the hook plate in which the groove $h$ is to be milled.

The device operates as follows:

The ribbed plates $r$ are pressed on one side of the chuck $a$ against the projections $c_1$ by the pistons $k$ and thus chucked. During the milling of the groove on that side of the chuck, $h$ the ribbed plates which have previously been milled may be replaced upon the opposite side by fresh plates. After the plates have been milled on one side, the apparatus is rotated about the shaft $l$ through an angle of 180° after which the plates can be treated on the opposite side of the chuck. The milling rotary cutter must have a radius equal to the length $s$, so that it can be used on the forward and return stroke for milling the grooves $h$ in their two possible positions.

Having thus described my invention what I claim as new and desire to secure by Letters Patent is:

1. A chuck for clamping special work pieces, comprising in combination, a supporting body having a plurality of pairs of spaced and rigid hooked jaws which are disposed parallel with one of the greater dimensions of said body, and which jaws in each pair extend mutually toward each other and are adapted to hook over and hold the side edges of the work pieces, a plurality of projectible clamping devices disposed in said supporting body independently of the hooked jaws and arranged in at least two distinct groups and adapted to be projected a limited distance from said body perpendicularly to said one dimension thereof and directly against the bottoms of the work pieces in order to clamp the latter while resting upon said clamping devices between the outer ends of said devices and the under portions of said jaws, and means effective to simultaneously actuate the clamping devices in each group independently of the rest so that one or more workpieces may be clamped in one group while workpieces in another group are released.

2. A chuck for clamping special work pieces, comprising in combination, a supporting body having a plurality of pairs of spaced and rigid hooked jaws which are disposed parallel with one of the greater dimensions of said body, and which jaws in each pair extend mutually toward each other and are adapted to hook over and hold the side edges of the work pieces, there being a plurality of cylindrical bores extending directly into said body beneath said work pieces, reciprocable pistons individually working in said cylindrical bores independently of said hooked jaws and adapted to be projected a limited distance from said body perpendicularly to said one dimension thereof and directly against the bottoms of the work pieces in order to clamp the latter while resting upon said pistons between the outer ends of the pistons and the under portions of said pairs of jaws, which pistons are arranged in parallel rows subdivided into at least two independent groups, distinct intercommunicating means in said supporting body independently interconnecting the cylindrical bores in each group and adapted to receive compressed air and distribute the same within the group so that the pistons in each group may be simultaneously actuated independently of the rest in order that one or more work pieces may be clamped in said group while work pieces in another group are released.

3. A chuck for clamping special work pieces, comprising in combination, a supporting body in the form of a single sided bed plate having a plurality of pairs of spaced and hooked jaws rigid with said bed plate and both disposed parallel with one of the greater dimensions of said bed plate and arranged in generally the same plane, and which jaws in each pair extend mutually toward each other and are adapted to hook over and hold the side edges of the work pieces, a plurality of reciprocable pistons extending independently of said hooked jaws into said bed plate beneath said work pieces and adapted to be projected a limited distance from said bed plate perpendicularly to said one dimension thereof and directly against the bottoms of the work pieces in order to clamp the latter while resting upon said pistons between the outer ends of the pistons and the under portions of said jaws, which pistons are arranged in parallel rows subdivided into at least two independent groups, distinct intercommunicating means in said bed plate adapted to cause simultaneous actuation of all of the pistons in each group independently of the rest in order that one or more work pieces may be clamped in said bed plate as a group while one or more work pieces in another group are released.

4. A chuck for clamping special work pieces, comprising in combination, a rotary supporting body having two working sides which are each bounded along their longitudinal edges by detachable hooked retaining jaws which upon each working side extend mutually toward each other and are adapted to hook over and hold the side edges of the work pieces, a plurality of parallel rows of parallel pistons disposed underneath the bottoms of said work pieces upon each working side of said body and extending independently of said hooked jaws directly into each of said working sides transversely to the latter and the longitudinal axis of the body, which pistons are divided into at least two distinct and independent groups, and passages in said supporting body for distributing compressed air independently to each group in order to actuate the pistons therein and thereby clamp one or more work pieces exteriorly to said pistons beneath the under portions of the respectively adjacent hooked jaws in the group while other work pieces are relased from beneath another group of hooked jaws.

5. Chuck for clamping special work pieces comprising a double-sided rotary body into each side of which are provided a plurality of parallel cylinders, two longitudinal U-shaped brackets detachably secured on the opposite edges of said body and provided with claw-shaped projections constituting the fixed hook-jaws of the chuck and arranged in opposed parallel rows, a plurality of pistons working in said cylinders directly underneath said work pieces so as to constitute the movable jaws of the chuck and arranged in two groups, and pressure means for actuating the pistons belonging to each of said groups respectively whereby to clamp said work pieces beneath said hook-jaws and expose between said jaws portions of the work pieces upon which work is to be done.

6. A chuck for clamping special work pieces, comprising in combination, a supporting body having a plurality of rigid hooked jaws forming corresponding pairs in which the individual jaws extend toward each other and are adapted to hook over the work pieces, a plurality of projectible clamping devices disposed in said supporting body independently of the hooked jaws and both arranged in at least two distinct groups and adapted to be projected outwardly against the bottoms of work pieces in order to clamp the latter between the outer extremities of said clamping devices and the inner sides of said hooked jaws so as to produce in each pair of hooked jaws and a corresponding clamping device a three-point clamping effect upon the work pieces involved, and means effective to actuate the clamping devices in each group independently of the rest so that one or more work pieces may be clamped in one group while work pieces in another group are released.

WILHELM SPETZ.